UNITED STATES PATENT OFFICE.

EARLE B. PHELPS AND ALBERT F. STEVENSON, OF RIDGEWOOD, AND JOHN C. BAKER, OF RIDGEFIELD PARK, NEW JERSEY, ASSIGNORS TO A. W. JOHNSTON, OF NEW YORK, N. Y.

MANUFACTURE OF MILK-FAT.

1,354,683.   Specification of Letters Patent.   Patented Oct. 5, 1920.

No Drawing.   Application filed June 26, 1919. Serial No. 306,808.

*To all whom it may concern:*

Be it known that we, EARLE B. PHELPS and ALBERT F. STEVENSON, residing at Ridgewood, county of Bergen, State of New Jersey, and JOHN C. BAKER, residing at Ridgefield Park, county of Bergen, and State of New Jersey, all citizens of the United States, have invented certain new and useful Improvements in Manufacture of Milk-Fats, of which the following is a full, clear, and exact description.

It is well recognized that milk and cream are merely emulsions of milk, or what is more commonly known as butter fat in milk fluid, or wh for a more ready understanding of the present invention, we shall more correctly term milk serum, and it is further a matter of common knowledge that this emulsion is a heterogeneous mixture, characterized by at least two phases, a continuous phase as exhibited by the body of the liquid, that is to say the watery fluid or skim milk, and a discontinuous or dispersed phase, as exhibited by the droplets or globules not in contact with one another, or, in other words, the milk fat globules.

This emulsion is stable, the surface tension conditions in normal milk or cream being such that an expenditure of energy is required to make the milk fat the continuous phase. This surface tension, existing at all liquid surfaces or boundaries, may be conceived of as acting as a stretched elastic cover for the surface, tending to cause such mensions. It is this, for example, that gives surface to assume the smallest possible dito a falling drop or a floating globule a spherical form.

If the volumes of the substances exhibiting the two phases above described were substantially the same, it is conceivable that a mixture of the two might exist in either of two forms, or in other words, either might become the continuous and the other the dispersed phase. But in the case of an emulsion such as that in question, we have to deal with two surfaces, the outer surface of the free globule and the surrounding surface of the continuous phase, forming the inner wall of the hollow sphere in which the globule floats. Obviously the external dimensions of the globule are somewhat less than the internal dimensions of the surrounding medium, and as both surfaces tend to assume the smallest possible dimensions, a condition of stability can exist only when the surface tension of the dispersed phase is greater than that of the continuous phase. A stable emulsion, in this sense, will show no tendency for the dispersed phase to agglomerate, or come out of the condition of emulsion, or change from the dispersed to the continuous phase, and an expenditure of energy is necessary to bring about such agglomeration.

The reverse of this, however, is not necessarily true. An unstable emulsion, in other words, will tend to reverse its phase and thereby reduce the net surface tension of the system and will do so unless such tendency be overcome by internal friction or viscosity of the fluid preventing free motion of the globules, by electrical charges, tending to hold the suspended globules apart, or by other physical forces.

Milk and cream, being stable, require such violent and prolonged treatment as churning, to bring about a change of phase. The fat globules will rise toward the surface of the milk up to a certain concentration in cream, beyond which gravitational force is insufficient to bring about a further separation, notwithstanding the fact that the milk fat has a less specific gravity than the milk fluid, and would rise as a clear oil on the surface were it not restrained by the surface tension forces. The cream may be separated by a centrifugal device, thereby applying a separative force many times greater than gravity without bringing about the slightest separation of the pure fat.

Butter is an emulsion of water in the fat; that is to say, the fat in butter is the continuous and the water the dispersed phase. The water is not pure, but contains the ingredients of butter milk, including coagulated casein or curd, milk sugar, albumin, mineral salts and bacteria. The perishable nature of butter is due primarily and in large part to the bacterial decomposition which takes place in the water phase. Butter is preserved by the addition of salt which tends to check this decomposition. Salted butter will keep much longer than sweet or unsalted butter.

Pure butter fat, practically free from bacteria and water, is subject to slight spontaneous chemical change, if exposed to air, which causes it to become rancid. It may, however, be kept for long periods in airtight containers, and this commercial practice has demonstrated.

For certain purposes, especially in connection with the use of dried milk powder in the baking, ice cream and allied industries, as well as in the preparation of the so called "reconstructed milk" from the desiccated constituents of whole milk, it is desirable to employ pure the fat, containing none of the impurities of the ordinary butter, and possessing more satisfactory keeping qualities. Such a product may and has been made heretofore indirectly from butter by melting and separating out the clear oil, but this process involves considerable loss of butter fat, as well as the entirely useless and expensive step of churning with its attendant losses.

Recognizing the great desirability of producing a milk fat directly from the milk or cream, without the necessity of churning or like processes, we have devised the method or process which we shall now describe as the invention forming the subject of the present application for Letters Patent.

The primary object of our invention is to so modify the normal relation of the constituents of milk, as by altering the surface tension characteristics of the milk serum in milk or cream, as to impair the stability of the emulsion until the particles of fat become capable of substantially complete coalescence and ready separation from the milk serum, that is to say, in a condition either to rise spontaneously as fat, or to be more readily removable by agitation or by means of an ordinary or specially designed centrifugal separator. We have found, in our investigations, that the stability of the emulsion is greatly decreased by partially replacing the milk serum with water.

The following considerations will show why this result follows: According to the phase rule of Gibbs, the substances dissolved in the milk fluid tend to concentrate at any boundary surface until the excess osmotic pressure due to such concentration over the osmotic pressure of the remainder of the milk fluid, is equal to the pressure due to surface tension. If, now, the milk fluid be diluted with water, its osmotic pressure is reduced accordingly, and diffusion of the dissolved substance away from the boundary surface takes place, thereby reducing the osmotic pressure at that surface and increasing the surface tension. With repeated washings there will result a successive increase of the surface tension at the boundary, until a point is reached, at which the larger fat globules are unstable and tend to coalesce. Further increase in surface tension permits smaller and smaller particles to coalesce, it being understood that the smaller the fat globule the greater its degree of stability, *per se*, and the more complete the treatment required for substantially perfect coalescence.

To accomplish this it is merely necessary to run the whole milk through a separator in the usual manner, separating the cream from the skim milk. The cream is then diluted with water, in volume about equal to the skim milk remaining after separation, mixed or stirred and again passed through the separator. This process may be repeated one or more times to secure increasingly complete removal of the milk fluid. If the washed cream product of this process be heated, a greater or less proportion of the milk fat, depending upon the thoroughness of the washing, will rise to the surface of the fluid as a clear milk fat oil.

We have further found that the same result may be obtained, although in somewhat more direct manner, by employing a dilute alkaline solution in place of pure wash water. Sodium hydroxid, for example, in the proportion of ten volumes of normal solution to 900 volumes of the diluted cream and water mixture, gives a very favorable reaction, and this mixture, run through a separator, yields a cream which is very unstable, and which on gentle heating rapidly separates a layer of oil. This effect is presumably due to the increased solubility of the casein in the milk in alkalis and hence to the more rapid washing out from the mixture. Other equivalent alkalies produce a similar effect, though perhaps less advantageously.

We have also found dilute acid solutions are even more profitably used in bringing about a modification of the surface tension. A slight addition of hydrochloric acid, for example, coagulates the remaining casein, not removed by the previous washing, and a further slight addition of acid redissolves this casein, rendering it more readily and easily removable by subsequent washings and also apparently increasing the surface tension of the serum, so that the emulsion is rendered less stable. Under the conditions of our investigations we have found that a total addition of 5 cubic centimeters of normal acid to the liter of washed and diluted cream is best suited to bring about the desired condition. Heating, gentle agitation, such as stirring as distinguished from ordinary churning or slow passage through a separator of ordinary kind, suffices to separate the clear milk fat oil from a cream thus treated.

Again we have found that the addition of certain salts such as about one per cent. of chlorid of sodium, to the washed cream, increases the surface tension of the milk serum sufficiently to render the emulsion unstable, and capable of agglomeration by heat.

In the above illustrative descriptions we have given the proportions of reagents that have been found to best produce the conditions desired, but we realize that these proportions are determined very largely by the working conditions, especially the age and initial acidity of the milk, and the chemical characteristic, especially as regards its alkalinity, of the water used in washing. The best single criterion of a proper reaction is a peculiar appearance of the fat in the washed cream, somewhat akin to curdling or coagulation, by which the operator is enabled to judge when the product is in suitable condition for the further step.

In the above description we have used the term "milk fat" in lieu of the more usual term "butter fat," to avoid possible confusion, since in this case we are dealing with the fat globules as they exist in milk, rather than in butter. For the same reason we use the term "milk serum" in order to distinguish clearly from milk in the generic sense of the word.

Having now described our invention, what we claim is:—

1. In the process of obtaining pure milk fat from milk and cream, the step which consists in so modifying the normal relations of the constituents of the same as to impair the stability of the emulsion to such a degree that the particles of fat are capable of substantially complete coalescence and ready separation from the milk serum.

2. In the process of obtaining pure milk fat from milk and cream, the step which consists in so modifying the surface tension of the milk serum as to impair the stability of the emulsion to such a degree that the particles of fat are capable of substantially complete coalescence and ready separation from the milk serum.

3. In the process of obtaining pure milk fat from milk, the step which consists in separating the cream from the skim milk and diluting the remaining milk serum out of the cream by washing with water to thereby render the emulsion unstable and the fat particles capable of substantially complete coalescence and more ready separation from the emulsion.

4. In the process herein described for obtaining pure milk fat from milk and cream, the steps which consist in facilitating the modification of the surface tension of the milk serum to render the fat emulsion unstable, by the use of chemical agents such as acids or their described equivalents, and then removing the latter from the fat.

5. The process herein described of obtaining pure milk fat from milk, which consists in separating the cream from the skim milk, diluting the milk serum which remains in the separated cream by washing with water, subsequently adding to the product an acidulated wash water, to facilitate the modification of the surface tension and to render the fat emulsion less stable, and then separating the acidified wash water from the fat.

6. The process of obtaining pure milk fat from separated cream which consists in treating the same so as to modify the surface tension of the milk serum, and thus permit the fat particles to coalesce and separate from the emulsion and then separating out the milk fat from the treated fluid by centrifugal action.

7. In the process of obtaining pure milk fat from milk, the steps which consist in separating out the cream as far as practicable, diluting the separated cream with water, and again separating out the cream from such solution centrifugally, and producing from such product pure milk fat.

8. The process of obtaining pure milk fat from milk, which consists in separating out the cream as far as practicable, diluting the separated cream with water together with acids or their described equivalents to facilitate the modification of the surface tension of the milk serum, and again separating out the cream from such solution.

In testimony whereof we hereunto affix our signatures.

EARLE B. PHELPS.
ALBERT F. STEVENSON.
JOHN C. BAKER.